Figure 1:
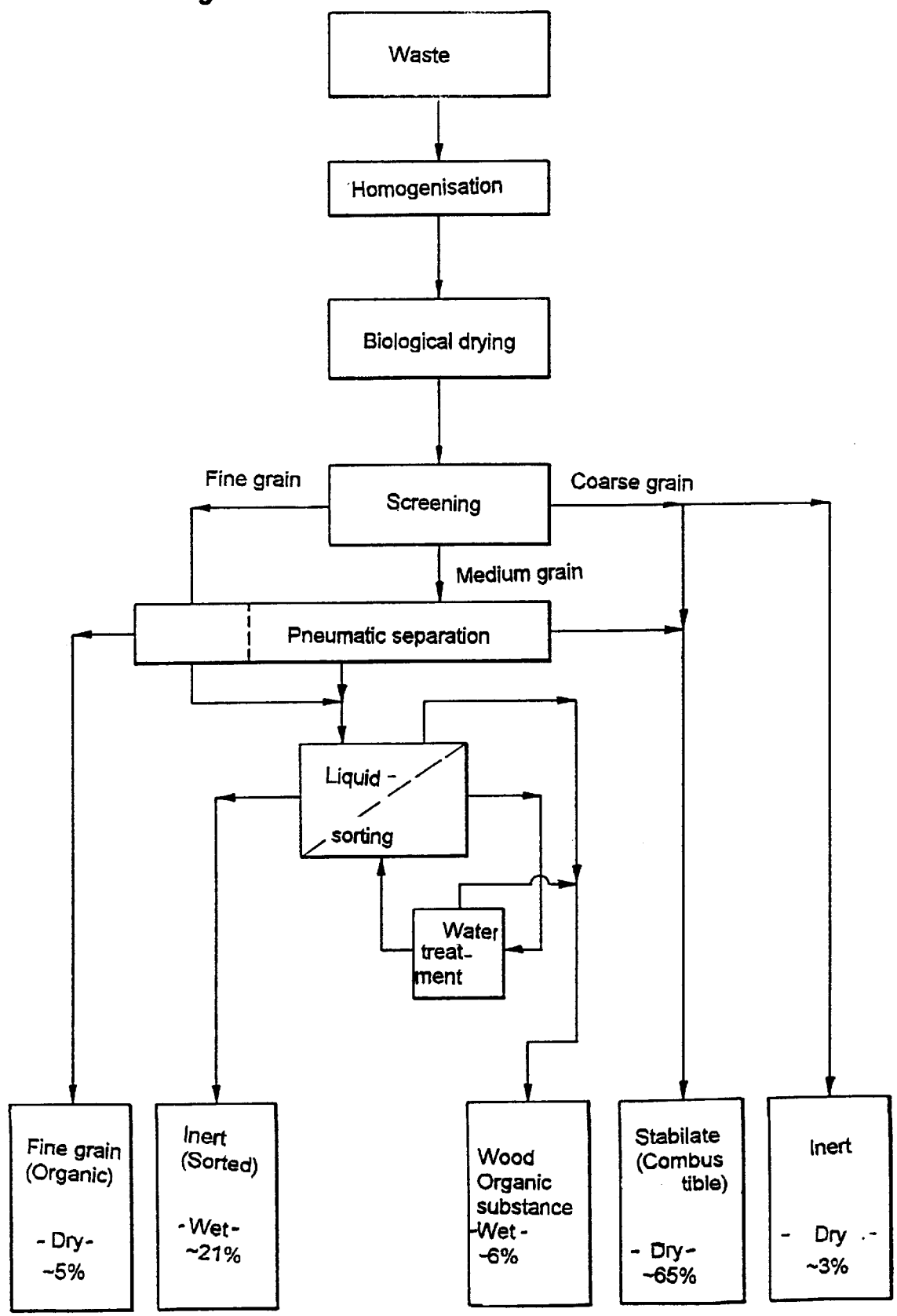

United States Patent [19]
Hofmann

[11] Patent Number: 6,093,323
[45] Date of Patent: Jul. 25, 2000

[54] METHOD FOR SEPARATING A MIXTURE OF RESIDUAL WASTES

[75] Inventor: Hermann Hofmann, Solms-Niederbiel, Germany

[73] Assignee: Herhof Umwelttechnik GmbH, Germany

[21] Appl. No.: 09/091,806

[22] PCT Filed: Oct. 21, 1997

[86] PCT No.: PCT/EP97/05811

§ 371 Date: Sep. 28, 1998

§ 102(e) Date: Sep. 28, 1998

[87] PCT Pub. No.: WO98/17410

PCT Pub. Date: Apr. 30, 1998

[30] Foreign Application Priority Data

Oct. 21, 1996 [DE] Germany ............................ 196 43 381
Dec. 2, 1996 [DE] Germany ............................ 196 49 901

[51] Int. Cl.[7] ................................. C02F 11/16; B09B 3/00
[52] U.S. Cl. .......................... 210/631; 210/770; 210/806
[58] Field of Search ..................................... 210/601, 612, 210/631, 605, 770, 771, 774, 806

[56] References Cited

U.S. PATENT DOCUMENTS

| | | | |
|---|---|---|---|
| 3,847,803 | 11/1974 | Fisk | 210/631 |
| 4,053,394 | 10/1977 | Fisk | 210/631 |
| 4,159,944 | 7/1979 | Erickson et al. | 210/631 |
| 5,531,898 | 7/1996 | Wickham | 210/631 |

FOREIGN PATENT DOCUMENTS

| | | |
|---|---|---|
| 0521685 | 1/1993 | European Pat. Off. . |
| 0706839 | 4/1996 | European Pat. Off. . |
| 3248494 | 12/1982 | Germany . |
| 3128528 | 2/1983 | Germany . |
| 4018810 | 12/1991 | Germany . |
| 4434611 | 4/1996 | Germany . |
| 195 03 669 | 8/1996 | Germany . |
| 81/03029 | 10/1981 | WIPO . |
| 83/02779 | 8/1983 | WIPO . |

OTHER PUBLICATIONS

WLB Wasser, Luft und Boden, *Mechanisch–biologische Abfallbehandlung mit kalter Rotte*; Nov.–Dec. 1995, p. 60.

T. Obermeier, "Abfallwirtschaftskonzept für Berlin und sein Umland", Muell und Abfall., Bd. 22, No. 12, Dec. 1990, Berlin, Germany, pp. 753–765.

*Primary Examiner*—Thomas G. Wyse
*Attorney, Agent, or Firm*—Ostrolenk, Faber, Gerb & Soffen, LLP

[57] ABSTRACT

A process for the separation of a mixture of waste. In order to improve such a process, the mixture is treated biologically, namely composted and/or stabilized under forced ventilation. The components of the mixture are subsequently separated into a combustible fraction and a non-combustible fraction, whereby the non-combustible fraction contains less than 5% organic substances.

3 Claims, 2 Drawing Sheets

METHOD FOR SEPARATING A MIXTURE OF RESIDUAL WASTES

The invention deals with a process for the separation of a mixture of waste.

Mixtures of waste have to be separated in order to be able to dispose of the various fractions in an appropriate manner. The object of the separation processes to be applied consists of separating the mixture into individual types of substances, as far as possible. However, waste mixtures are from this aspect extremely difficult mixtures of substances. The constantly changing composition of waste calls for processes which make it possible to grade the heterogeneity of the multi-substance mixture "waste" before separating it. Processes have proved themselves which differentiate according to the substance density, whereby the transport media can be gases or liquids.

The so far known processes and devices become more expensive as the required degree of purity of the substances to be separated increases. The use of substances is restricted by the degree of purity of the substance and the market price which can be obtained in competition with fresh raw materials.

When treating municipal waste, residual fractions remain which have to be either taken to a refuse tip or incinerated and taken to a tip. According to future regulations, disposal on refuse tips is subject to a residual organic content of less than 3% in building debris and less than 5% in household refuse. In order to achieve this, a selection of inert substances and the processing of combustible substances have to be effected with the existing emission risks of erosion which also exist here.

The up to now practised biological-mechanical treatment of waste following elimination of usable substances by separate collection is intended largely to reduce the organic substances in the waste in order thus to approach the required values of 3% respectively 5% residual organic substances. However, this results in plants requiring considerable space, because the biological decomposition of organic substances which are hard to degrade only takes place very slowly (6 to 8 months) and the waste throughout this period is subject to technical checks and control. This is followed sometimes by a separation of substances with the aid of known sorting processes in a moist state (approximately 35%).

W L B Wasser, Luft und Boden, Nov. 12, 1995, page 60, shows a process for the mechanical-biological waste treatment using waste of organic content. This is a dynamic process of mechanical-biological, aerobic waste treatment operating by a multi-stage intensive rot in a rot drum.

DE-OS 44 34 611 discloses a process for biological mechanical treatment of waste by which the refuse supplied is screened, broken up and homogenised. The refuse is then subjected in a rot to a biological decomposition process. Following rotting, the rotted product is separated into an organic and an inorganic fraction.

DE-PS 32 48 494 discloses a process for the production of a fuel for a refuse incinerator plant. In order to render possible the production of a fuel free from harmful substances and of improved calorific value, household refuse is divided in a first screening drum into overflow and substances passing through the screen. The overflow is subjected to a metal separation. Following composting in a bioreactor, the substances having passed through the screen are separated in a second screen drum into a fine fraction obtained as compost and an overflow.

The problem to be solved by the invention consists of proposing processes of the above mentioned type which ensure that non combustible substances contained in waste do not reach an incinerator plant and are not taken to a refuse tip whilst containing more than 3% respectively 5% organic substances.

According to a first proposal, this problem is solved as follows. If applicable following breaking up and/or homogenisation, the mixture is treated biologically ie composted and/or stabilised under forced ventilation. This takes place preferably in a closed container. Following this, the components of the mixture thus treated are separated into a combustible fraction and a noncombustible fraction. Separation takes place in such a manner that the noncombustible fraction contains less than 5% organic substances. The biological treatment, in other words composting and/or stabilisation, is preferably effected in the form of a so called intensive rot. This intensive rot is preferably effected over a period of five to ten days, furthermore preferably over a period of six to eight days, furthermore preferably over a period of seven days. The material is preferably dried at the end of the intensive rot. It follows that the intensive rot preferably terminates by drying. The thus separated noncombustible fraction, which can also be called inert fraction, can contain mineral substances and/or ferrous metals and/or nonferrous metals.

Separation of the fractions preferably takes place by screening. Separation of the fraction can instead or in addition take place by pneumatic separation, the latter being preferably effected following screening. In lieu of or in addition to this, separation of the fractions can take place by liquid sorting. Liquid sorting is effected preferably following screening and/or pneumatic separation.

A further advantageous development is characterised by the fact that the mixture is recycled before the biological treatment and breaking up and/or homogenisation. It is a particular advantage if the mixture is utilised instead or in addition as a substance after screening. Recycling of the mixture thus preferably takes place, preferably after screening, furthermore preferably before biological treatment and breaking up and/or homogenisation.

This process according to the invention can be carried out in a device for the biological treatment of a mixture of waste. The device consists of a closed container with forced ventilation and an appliance for the subsequent separation of the mixture into a combustible fraction and a non-combustible fraction, preferably a screening appliance and/or a pneumatic separator and/or a liquid sorting device.

A breaking up device and/or a homogenisation device is preferably used. It is also advantageous to provide a device for recycling of the substance.

A further solution of the above mentioned problem, for which separate protection is claimed, is as follows. The mixture components are—if applicable following homogenisation—separated into a combustible fraction and a non-combustible fraction. Following this, the combustible fraction is treated biologically, namely composted and/or stabilised under forced ventilation. This takes place preferably in a closed container. Separation of the fractions is effected in such a manner that the non-combustible fraction contains less than 5% organic substances.

Separation of the fractions takes place preferably with the aid of a sink-swim separator.

Furthermore, it is advantageous to break up and/or homogenise the mixture prior to separation into a combustible fraction and a non-combustible fraction.

The process according to the invention can be effected in a device for the separation of a mixture of waste. The device consists of a separation appliance to separate the components of the mixture into a combustible fraction and a noncombustible fraction, preferably a sink-swim separator, and of a device for the biological treatment of the combustible fraction, ie a closed container with forced ventilation. Furthermore, a breaking up device and/or a homogenisation device is preferably provided.

Both solutions according to the invention result in the fact that non-combustible substances (eg stones, ceramics, sand, glass, metals and other heavy substances) contained in the waste neither reach an incinerator plant, nor are taken to a refuse tip with an organic content in excess of 3% (for building debris tips) and 5% (for household refuse tips), and that the non-combustible substances in the combustible fraction are reduced to less than 10% by weight. This is ensured by the maximum degree of separation accuracy which can be achieved with the aid of the solutions according to the invention, provided humidity and the biologically easily degradable organic substances are eliminated from the waste.

When carrying out the processes according to the invention, known plants for processes and with devices for the separation of waste can be used, particularly screen units, pneumatic separation units, gravity separation units, whirl separation units and/or flotation separation units.

Figure 2:
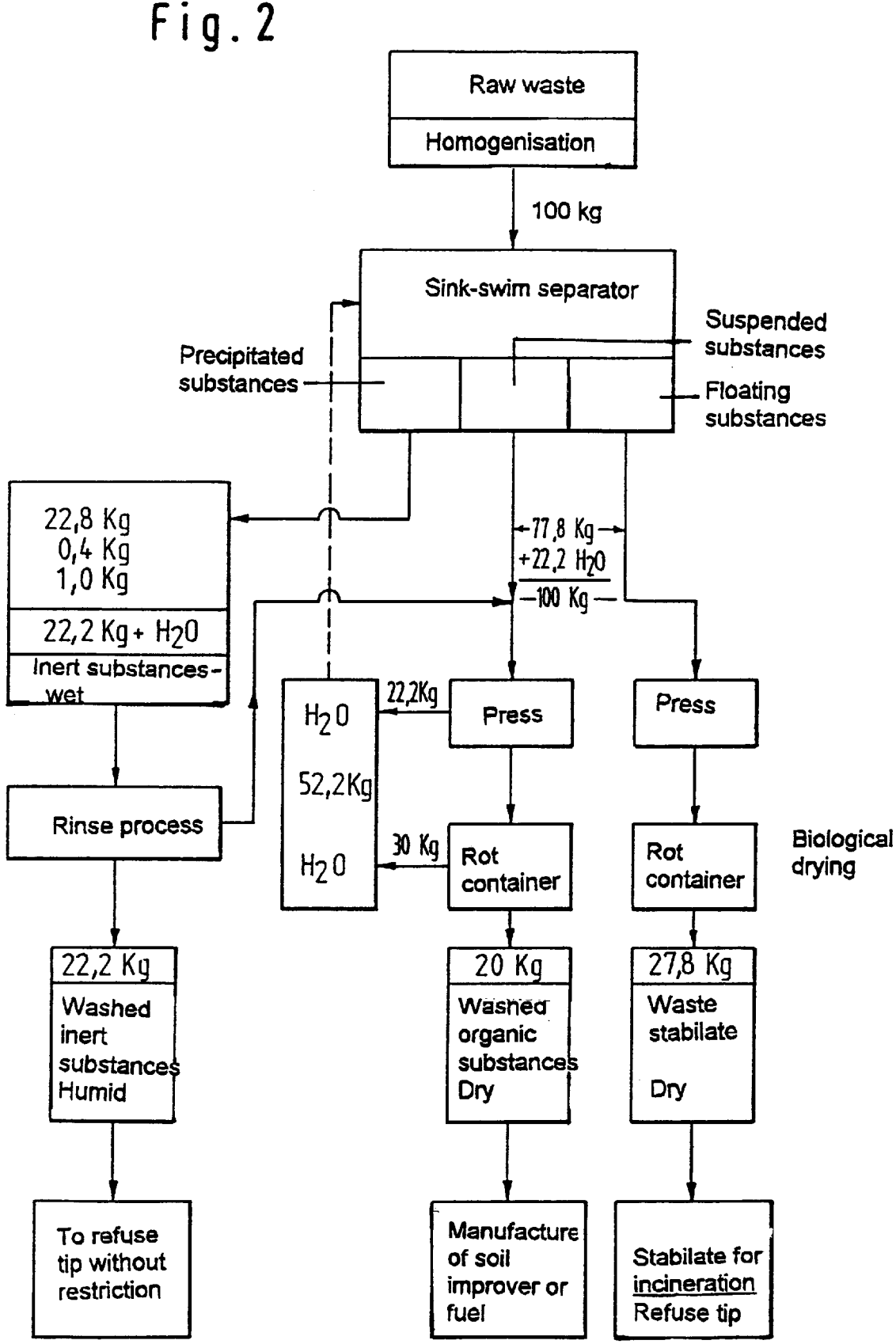

The solutions according to the invention make it possible to separate inert and organic fractions over a much shorter period than up to now (about one week) before and/or after biological decomposition of the easily degradable organic substances from the dried waste (the waste is preferably dried to below 15% residual humidity) by a combination of dry sorting and liquid sorting. Furthermore, it is possible to fix the harmful matter bound to the substances in an insoluble manner or—if they are mobile—to remove them during the rinse process and, following separation by mechanical-biological means, to dispose of them from the liquid medium separately in a concentrated condition, Examples of the invention are illustrated below with the aid of the attached drawings, as follows:

FIG. 1 shows an example in a schematic form of a process and a device based on the first proposal according to the invention, and, FIG. 2 shows an example in a schematic form of a process and a device based on the second proposal according to the invention.

In the example illustrated by FIG. 1 the waste, in other words the waste mixture, is broken up and homogenised. This is followed by "biological drying". This may involve composting and/or stabilisation in a closed container under forced ventilation. The substance thus produced is subjected to screening. The fine grain fraction and the medium grain fraction are taken to a pneumatic separator. Pneumatic separation of the fine grain fraction and the medium grain fraction can take place separately, The pneumatic separation produces a dry organic fine grain fraction and a dry combustible stabilate fraction. The other fraction is subjected to liquid sorting. The liquid sorting process thus takes place after a screening and separation plant for biologically dried stabilate. The liquid sorting process produces a wet inert fraction. The liquid is taken through a circuit by a water treatment unit. The liquid sorting process and the water treatment separates a wet fraction with wood and organic substances.

The coarse grain fraction separated during screening is divided into a dry combustible fraction (stabilate) and a dry inert fraction. The dry combustible fraction (stabilate) also includes the dry organic fine grain fraction.

Following screening recycling takes place in the coarse grain fraction (dry inert fraction and dry combustible stabilate fraction). Recycling can also take place before breaking up and homogenisation. Recycling takes place by whirl separation, manual grading, magnetic separation, visual separation or by some other appropriate process.

In the example illustrated by FIG. 2, the raw waste (raw waste, mixture) is first of all broken up and homogenised and subsequently taken to a sink-swim separator. The sediments separated there form a fraction of wet inert substances. This fraction is subjected to a rinse process, thus producing a humid fraction of washed inert substances which can be taken to a refuse tip without any restrictions.

The suspended matter is separated in the sink-swim separator and the substances separated during the rinse process are taken to a first press. The water produced there is returned to the sink-swim separator. The substances are taken from the first press to a first closed rot container, where they are composted and dried biologically under forced ventilation. This produces a dry fraction of washed organic substances which can be used for the manufacture of soil improvers or as fuel.

The floating substances separated in the sink-swim separator are taken to a second press, and from there to a second closed rot container, where they are composted and dried biologically under forced ventilation, thus producing a dry fraction of waste and stabilate which is suitable for incineration and/or taking to a refuse tip. The water produced in the presses and the rot containers is treated and returned to the sink-swim separator. The water treatment can take place aerobically and/or unaerobically.

FIG. 2 illustrates a sorting process effected prior to the biological decomposition of the easily degradable organic substance. The difference between this and FIG. 1 consists of the fact that only the part-flow (eg about 0–40 mm to 0–60 mm) produced following the biological decomposition of the easily degradable organic substance and a screen-pneumatic separation of the dry stabilate, is taken through the liquid separation in FIG. 1. In the case of FIG. 2, the whole of the waste is taken through the liquid separation before biological drying takes place. The method chosen is also a function of the humidity and/or granulation of the raw waste. It is well known that microbial degrading presupposes a given humidity and that this humidity is not always present in the waste to a sufficient extent.

Rinsing of the inert substances is effected in such a manner that the lighter particles are discharged from the rinse water circuit in a suspended condition and are removed by liquid screening and/or gravity separation. Separation of the floatable fractions can be promoted by flotation. A further advantage consists of the fact that, by controlling the temperature and pH of the rinse liquid, it is possible to control the heavy metals in the solution. The substances produced following the process can be mixed in a better manner than up to now with other substances for the identical re-use, or can be added to them (eg building material manufacture, fuel production etc).

The processes and devices according to the invention for the separation of waste can assume the form of screening, pneumatic, swim, sink and/or flotation separation. The various substance components of approximately the same density can be separated, before and/or after biological stabilisation, in a rot box into combustible and non-combustible fractions. This can be done at a substance purity in excess of 95%. As a result of the separation, it is possible to produce inert substances of less than 3% organic content (for refuse tip category 1) and less than 5% organic content (for refuse tip category II). The fraction of combustible substances can contain less than 10% mineral components.

Following separation by liquid screening and/or gravity separation, the suspended fraction of the flotation liquid can be used in a clean condition as soil improver and/or fuel. The quantity of the remaining fraction which cannot be recycled can be packed in bales as a dry stabilate. The dry stabilate can be incinerated loose or in bales and/or briquettes. The part-components of the substances produced can be mixed with other substances. Liquid sorting can take place before biological drying of the waste. But it can also take place after biological drying of the waste. Liquid sorting of the heavy fraction of biologically dried waste can take place following screening, following screening and whirl separation or following screening, whirl separation and/or pneumatic separation, as a result of which the hydrophobic element generated as a result of the biological drying promotes the separation of floatable combustible waste components,

What is claimed is:

1. A process for the separation of a mixture of waste into a combustible fraction and a non-combustible fraction, comprising the steps of:

breaking up and homogenizing the mixture;

composting and stabilizing the mixture in a closed container under forced ventilation for 5 to 10 days to create an intensive rot;

terminating the intensive rot by drying the mixture to below 15% residual humidity;

subsequently separating the mixture into a combustible fraction and a noncombustible fraction by screening, and pneumatic separation following the screening;

wherein the resulting combustible fraction contains less than 10% by weight of non-combustible substances, and wherein the resulting non-combustible fraction contains less than 5% organic substances.

2. The method according to claim 1, wherein said composting and stabilizing step is carried out for 6 to 8 days.

3. The method according to claim 2, wherein said composting and stabilizing step is carried out for 7 days.

* * * * *